Patented May 23, 1933

1,910,691

UNITED STATES PATENT OFFICE

IVAN GUBELMANN AND CLYDE O. HENKE, OF SOUTH MILWAUKEE, WISCONSIN, ASSIGNORS, BY MESNE ASSIGNMENTS, TO NEWPORT INDUSTRIES, INC., A CORPORATION OF DELAWARE

HYDROGENATION OF ABIETENE

No Drawing. Application filed February 26, 1930. Serial No. 431,626.

This invention relates to new hydrogenation products and to a process of preparing the same, and more particularly to such products as are obtained by the hydrogenation of oily hydrocarbons of the abietene family with hydrogen under pressure and in the presence of a hydrogenating catalyst.

It is, accordingly, an object of this invention to provide a method for preparing hydrogenation products which are excellent solvents and which can be used as starting materials for the production of derivatives having special utility in the textile industry.

A further object of this invention resides in the production of new hydrogenation products of abietene-containing material.

Another object of this invention consists in the provision of a process for hydrogenating abietenes by means of hydrogen under pressure and in the presence of a hydrogenation catalyst.

Other and further important objects will become apparent from the following description and appended claims.

We have found that abietenes, that is oily hydrocarbons of the abietene family, can be hydrogenated while in the liquid state by the use of hydrogen in conjunction with various hydrogenating catalysts. These various, so-called hydrogenating catalysts are well known in the art of hydrogenation, and, in the main, comprise those metals in group 8 of the periodic system, the best known of which are platinum, palladium, nickel and cobalt. We have found that it is preferable to employ nickel as the catalytic agent, but it should be borne in mind that any of the other above named catalysts may be employed either alone or in combination.

When carrying out the hydrogenation process, it will be noted that the different conditions of operation are functions of each other, in that one condition has a definite effect on another. For instance, if platinum or palladium is used as the catalytic agent, the reaction appears to set in at a considerably lower temperature than if nickel is employed. Furthermore, the rate at which the reaction proceeds will vary according to the pressure of hydrogen in the reaction mass; generally speaking, the greater the pressure, the higher the speed of the reaction.

When employing nickel as the catalyst, the reaction appears to set in at about 150 to 180° C. The preferred operating temperature is about 225 to 250° C., since, at these temperatures, hydrogenation proceeds at a controllable rate and, moreover, such temperatures are sufficiently low as to admit of obtaining a large yield of the end product. It is to be understood, however, that these temperatures are not limitations on the process, as the same may be successfully carried out at much higher temperatures than 250° C. with a hydrogen pressure ranging from about 150 to 400 pounds per sq. in. or higher.

The composition of the starting material, that is the oily hydrocarbons hereinafter referred to as abietenes, is not definitely known, and may vary quite considerably, depending upon its source and history. All the members of this class of compounds are obtainable by pyrogenic decomposition of rosin, abietic acid or abietyl chloride. We have hydrogenated several of the various abietenes mentioned in the article of Ruzicka, Helvetica Chemica Acta, volume 6, page 838 et seq. as well as those prepared according to the U. S. patent of Palmer, No. 1,660,762 and the U. S. patent to Clyde O. Henke, No. 1,853,353, and obtained an abietane in each case.

The abietene disclosed in said Clyde O. Henke patent is prepared by refluxing an abietic acid containing material such as wood rosin in an iron still at a temperature of about 350 to 375° C. until substantially all the abietic acid is decomposed and distilling the refluxed mass at a temperature below 450° C. The fraction distilling at this temperature contains the abietene.

The following example in which parts by weight are given serve to illustrate the preferred method for carrying out our invention.

*Example*

2000 parts of abietene (which may be any of the above referred to oily products) are placed in an iron autoclave provided with an agitator. 40 parts of catalytic nickel are added, and the air in the autoclave replaced by hydrogen. The autoclave is then closed and heated to about 225° C. and hydrogen led in until a pressure of from about 300 to 400 lbs. per square inch is obtained. This pressure is maintained until no further absorption takes place, which will consume about two to three hours' time. When the autoclave has cooled slightly, the pressure is released. The reaction mass is then vacuum distilled and the product, which we term "abietane", passes over as a vapor and is recovered by condensation. The catalyst remaining as a residue may be reused for subsequent hydrogenation batches without being purified.

This hydrogenation process, which appears to proceed regularly to completion, results on the average, in the absorption of approximately 1 to 4 atoms of hydrogen per molecule of abietene, the amount absorbed depending on the initial abietene material. For example, an abietene body prepared as described in C. O. Henke's U. S. Patent No. 1,853,353, will absorb over twice as much hydrogen as one prepared according to U. S. Patent No. 1,660,762 issued to Robert C. Palmer. This difference in hydrogen absorption may be due to different ratios of abietene to abietine in the initial material as has been pointed out by Ruzicka, et al. (ibid) or to other causes.

The hydrogenation process is practically the same with all the different abietenes, the principal difference being in the time required, which further depends on the amount of hydrogen absorbed.

If it is desired, the hydrogenation may be stopped at any intermediate point, whereby a product will be obtained which is apparently a mixture of the original abietene material and the product resulting from complete hydrogenation.

The products resulting from the hydrogenation of this group of products called abietenes we call abietanes. The abietane from any of the above mentioned abietenes is an oil, which has a specific gravity of about 0.96 to 0.97 at 15° C. and distills for the most part between 320° and 350° C. The optical rotation will vary considerably but is usually about the same as that of the particular abietene material from which it is derived. The appearance of the various abietanes differs a great deal. Thus an abietane made from an abietene body prepared according to U. S. Patent No. 1,660,762 (Palmer) is practically colorless and has a slight bluish fluorescence while abietane made from the abietene prepared according to C. O. Henke's Patent No. 1,853,353 becomes straw colored on standing. Also the sulfonation products of the various abietanes are different. Thus the sodium salt of the sulfonation product of the abietane from the abietene prepared by the Palmer method is sticky and cannot be powdered successfully while the sodium salt of the sulfonation product of the abietane from the abietene prepared by the method of our copending application above referred to is dry and can be readily pulverized. Beside the property of pulverizing readily, the last named product is about twice as good a wetting agent as the former.

We do not know the reason for the differences in the various abietenes and the abietanes resulting from their hydrogenation. Our invention resides in the fact that we can by hydrogenation of any of the various abietenes mentioned above produce a new group of substances which we call abietanes. The only difference in the hydrogenation of the various abietenes is in the amount of hydrogen absorbed. The resulting abietanes are similar as regards boiling range and gravity but very different in optical rotation, color and in the properties possessed by their sulfonation products.

The above examples merely serve to illustrate the preferred method of carrying out our invention, and may be considerably modified by changing the various conditions of operation, such as the pressure of hydrogen, the hydrogenation catalyst, and the temperature of the hydrogenation. It should, therefore, be understood that our invention is not limited to the specific example disclosed.

Throughout the specification and claims, we refer to the new hydrogenation products of the various abietenes, as abietanes.

We are aware that numerous details of the process may be varied through a wide range without departing from the principles of this invention, and we therefore do not purpose limiting the patent granted hereon, otherwise than necessitated by the prior art.

We claim as our invention:

1. The process which comprises reacting abietene-containing material with hydrogen under pressure and at a temperature of from about 150 to 300° C. in the presence of a nickel catalyst.

2. The process which comprises reacting abietene-containing material with hydrogen at a temperature of from about 200 to 250° C. and under a pressure of from about 150 to 400 pounds per square inch in the presence of a nickel catalyst.

In testimony whereof, we have hereunto subscribed our names at Carrollville, Milwaukee County, Wisconsin.

IVAN GUBELMANN.
CLYDE O. HENKE.